United States Patent
Yue (10) Patent No.: US 11,929,191 B1
(45) Date of Patent: Mar. 12, 2024

(54) METHOD FOR MANUFACTURING MAGNETIC DATA LINE

(71) Applicant: Wenyong Yue, Shenzhen (CN)

(72) Inventor: Wenyong Yue, Shenzhen (CN)

( * ) Notice: Subject to any disclaimer, the term of this patent is extended or adjusted under 35 U.S.C. 154(b) by 0 days.

(21) Appl. No.: 18/473,223

(22) Filed: Sep. 23, 2023

(30) Foreign Application Priority Data

Sep. 22, 2023 (CN) .......................... 202311227715.6

(51) Int. Cl.
| | |
|---|---|
| B29C 45/14 | (2006.01) |
| B29C 45/00 | (2006.01) |
| B29C 45/16 | (2006.01) |
| H01B 13/00 | (2006.01) |
| B29K 21/00 | (2006.01) |
| B29L 31/34 | (2006.01) |
| H01B 11/00 | (2006.01) |

(52) U.S. Cl.
CPC ..... *H01B 13/0036* (2013.01); *B29C 45/0013* (2013.01); *B29C 45/0053* (2013.01); *B29C 45/14008* (2013.01); *B29C 45/14426* (2013.01); *B29C 45/14549* (2013.01); *B29C 45/14819* (2013.01); *B29C 45/1671* (2013.01); *H01B 13/0016* (2013.01); *B29C 2045/0079* (2013.01); *B29C 2793/0072* (2013.01); *B29C 2945/76157* (2013.01); *B29K 2021/00* (2013.01); *B29L 2031/3462* (2013.01); *H01B 11/00* (2013.01)

(58) Field of Classification Search
CPC .................... B29C 45/14426; B29C 45/14549
See application file for complete search history.

(56) References Cited

U.S. PATENT DOCUMENTS

| | | | | |
|---|---|---|---|---|
| 5,114,517 | A * | 5/1992 | Rippingale | G01V 3/15 264/108 |
| 6,594,885 | B2 * | 7/2003 | Abdel-Tawab | H01F 27/292 336/83 |
| 6,689,297 | B1 * | 2/2004 | Mizuta | F16J 15/064 264/108 |
| 2016/0089823 | A1 * | 3/2016 | Ikeda | B29C 45/2669 264/272.13 |

FOREIGN PATENT DOCUMENTS

| | | | |
|---|---|---|---|
| CN | 207925840 | * | 9/2018 |
| CN | 212392445 | * | 1/2021 |
| FR | 2848137 | * | 6/2004 |
| WO | WO9213227 | * | 8/1992 |

* cited by examiner

*Primary Examiner* — Edmund H Lee
(74) *Attorney, Agent, or Firm* — Daniel M. Cohn; Howard M. Cohn (57) ABSTRACT

A method for manufacturing a magnetic data line includes steps of providing a plurality of metal wires; forming a rubber layer around the plurality of metal wires, magnetizing the rubber layer to make the rubber layer magnetic; and baking the rubber layer that is magnetic within a predetermined time under a predetermined temperature to make magnetic poles of the rubber layer stable to obtain the magnetic data line. The rubber layer is made from a mixture containing at least rubber and magnetic powder.

18 Claims, 8 Drawing Sheets

METHOD FOR MANUFACTURING MAGNETIC DATA LINE

TECHNICAL FIELD

The present disclosure relates to a technical field of electronic devices, and in particular to a method for manufacturing a magnetic data line.

BACKGROUND

A data line is a commonly used charging component for electronic devices. The data line is long and is easy to get tangled when carrying. Therefore, it often takes time to untie the data line when using it, which is very troublesome. In addition, a tangled data line looks unsightly and takes up space. The data line currently on the market generally have disadvantage of being inconvenient to store. When the data line is not in use, since the data line is flexible, the data line appears messy in a stored stable, especially in application scenarios where the data line needs to be stored in a narrow space such as a handbag, a pocket, a backpack, etc., the date line not only occupies a larger storage space, but also seriously impedes a user's access to other items in the narrow space. To sum up, the data line is inconvenient to use, visually very messy, and the user experience is poor.

In order to facilitate storage of the data line, magnetic data lines are created.

For example, the CN patent No. CN212392445U discloses a magnetic data line where magnet blocks are sleeved on a data line body. When the magnetic data line is wound for storage, the magnet blocks are magnetically attracted to each other.

Further, the CN patent No. CN211655236U discloses a magnetic data line. Magnetic suction portions are arranged on a main body of the magnetic data line. The main body of the magnetic data line is wound into rings that are stacked together for storage. The magnetic suction portions on any upper ring and an adjacent lower ring are attracted to each other to position the rings.

Furthermore, the CN patent No. CN213717212U discloses a magnetic data line that is easy to store, where magnetic rings is sleeved on a main body thereof. When the magnetic data line needs to be stored, the magnetic data line is neatly stored through the magnetic rings.

However, in technical solutions disclosed in above-mentioned prior patents, when the magnetic data line is wound and stored, the magnetic suction portion (or the magnet blocks, the magnetic rings) enable any upper layer of the magnetic date line to be connected to an adjacent lower layer of the magnetic data line and lower layers after being wound, so as to realize positioning and winding of the magnetic data line.

When winding, the magnetic suction portions (or the magnet blocks, the magnetic rings) arranged on any upper layer of the magnetic date line and the adjacent lower layer of the magnetic data line need to be aligned for connecting. Therefore, a winding operation thereof is cumbersome. Further, a distance between each two adjacent magnetic suction portions (or the magnet blocks, the magnetic rings) is fixed, making it difficult to control a size of the magnetic data line after winding.

SUMMARY

The present disclosure provides a method for manufacturing a magnetic data line to solve technical problems mentioned above.

Embodiments of the present disclosure provides the method for manufacturing the magnetic data line. The method comprises providing a plurality of metal wires;

forming a rubber layer around the plurality of metal wires, where the rubber layer is made from a mixture containing at least rubber and magnetic powder;

magnetizing the rubber layer to make the rubber layer magnetic; and baking the rubber layer that is magnetic within a predetermined time under a predetermined temperature to make magnetic poles of the rubber layer stable to obtain the magnetic data line.

In one optional embodiment, a step of forming the rubber layer around the plurality of metal wires comprises:

providing a mold sleeved on the plurality of metal wires;

injecting the mixture into the mold to form the rubber layer, where the mixture is coated around the plurality of metal wires;

removing the mold after the rubber layer is formed; and enabling the rubber layer to have a first surface and a second surface; where the first surface of the rubber layer is opposite to the second surface of the rubber layer.

In one optional embodiment, after magnetizing the rubber layer, the first surface of the rubber layer has a first magnetic pole and the second surface of the rubber layer that is magnetic has a second magnetic pole. A polarity of the first magnetic pole is opposite to a polarity of the second magnetic pole.

In one optional embodiment, a width of the first surface of the rubber layer is not less than 3 mm, and a width of the second surface of the rubber layer is not less than 3 mm.

In one optional embodiment, the width of the first surface of the rubber layer is equal to the width of the second surface of the rubber layer.

In one optional embodiment, the first surface of the rubber layer is flat and the second surface of the rubber layer is flat.

In one optional embodiment, the first surface of the rubber layer is parallel to the second surface of the rubber layer.

In one optional embodiment, the rubber layer further comprises a first arc surface and a second arc surface. The first arc surface of the rubber layer is opposite to the second arc surface of the rubber layer. The first arc surface of the rubber layer is connected with the first surface and the second surface of the rubber layer. The second arc surface of the rubber layer is connected with the first surface and the second surface of the rubber layer.

In one optional embodiment, after a step of magnetizing the rubber layer to make the rubber layer magnetic and before a step of baking the rubber layer within the predetermined time under the predetermined temperature to make the magnetic poles of the rubber layer stable to obtain the magnetic data line, the method further comprises winding the rubber layer that is magnetic and the plurality of metal wires in a fixture to enable the rubber layer that is magnetic to form magnetic rings.

Each of the magnetic rings defines a first side and a second side. The first side of each of the magnetic rings is adjacent and opposite to the second side of an adjacent magnetic ring of the magnetic rings.

The step of baking the rubber layer that is magnetic within the predetermined time under the predetermined temperature to make the magnetic poles of the rubber layer stable to obtain the magnetic data line comprises baking the rubber layer wound in the fixture within the predetermined time under the predetermined temperature.

In one optional embodiment, the fixture comprises a groove structure. An outer surface of the rubber layer that is magnetic is matched with the groove structure.

In one optional embodiment, the predetermined temperature is in a range of 80-110° C.

In one optional embodiment, the predetermined time is in a range of 25-35 min.

In one optional embodiment, after the step of forming the rubber layer around the plurality of metal wires and before the step of magnetizing the rubber layer to make the rubber layer magnetic, the method further comprises forming a protective layer wrapping on an outer surface of the rubber layer.

In one optional embodiment, a thickness of the protective layer is no more than 0.6 mm.

In one optional embodiment, the step of forming the protective layer wrapping on the outer surface of the rubber layer comprises wrapping a layer of braided wires on the outer surface of the rubber layer to form the protective layer.

In one optional embodiment, after the step of magnetizing the rubber layer to make the rubber layer magnetic and before the step of baking the rubber layer that is magnetic within the predetermined time under the predetermined temperature to make the magnetic poles of the rubber layer stable to obtain the magnetic data line, the method further comprises cutting the magnetic rubber and the plurality of metal wires.

In one optional embodiment, after the step of magnetizing the rubber layer to make the rubber layer magnetic and before the step of baking the rubber layer that is magnetic within the predetermined time under the predetermined temperature to make the magnetic poles of the rubber layer stable to obtain the magnetic data line, the method further comprises
  welding a first connecting head to first ends of the plurality of metal wires; and
  welding a second connecting head to second ends of the plurality of metal wires.

In one optional embodiment, before the step of welding the first connecting head to the first ends of the plurality of metal wires, the method further comprises:
  removing a first portion of the rubber layer that is magnetic wrapping on the first ends of the plurality of metal wires; and
  removing a second portion of the rubber layer that is magnetic wrapping on the second ends of the plurality of metal wires.

In one optional embodiment, after the step of forming the rubber layer around the plurality of metal wires and before the step of magnetizing the rubber layer to make the rubber layer magnetic, the method comprises forming a protective layer wrapping on an outer surface of the rubber layer.

After the step of magnetizing the rubber layer to make the rubber layer magnetic and before the step of baking the rubber layer that is magnetic within the predetermined time under the predetermined temperature to make the magnetic poles of the rubber layer stable to obtain the magnetic data line, the method further comprises:
  cutting the magnetic rubber and the plurality of metal wires;
  welding a first connecting head to first ends of the plurality of metal wires;
  welding a second connecting head to second ends of the plurality of metal wires; and
  winding the rubber layer that is magnetic and the plurality of metal wires in a fixture to enable the rubber layer that is magnetic to form magnetic rings, where each of the magnetic rings defines a first side and a second side, and the first side of each of the magnetic rings is adjacent and opposite to the second side of an adjacent magnetic ring of the magnetic rings.

The step of baking the rubber layer that is magnetic within the predetermined time under the predetermined temperature to make the magnetic poles of the rubber layer stable to obtain the magnetic data line comprises baking the rubber layer wound in the fixture within the predetermined time under the predetermined temperature.

In one optional embodiment, after magnetizing the rubber layer, the first surface of the rubber layer has a first magnetic pole and the second surface of the rubber layer has a second magnetic pole. A polarity of the first magnetic pole is opposite to a polarity of the second magnetic pole.

A width of the first surface of the rubber layer is not less than 3 mm, and a width of the second surface of the rubber layer is not less than 3 mm. The width of the first surface of the rubber layer is equal to the width of the second surface of the rubber layer. The first surface of the rubber layer is flat and the second surface of the rubber layer is flat. The first surface of the rubber layer is parallel to the second surface of the rubber layer.

The magnetic data line in the embodiments of the present disclosure is easily wound and stacked, and rings formed by the magnetic data line after a winding and stacking process are effectively attracted together, thereby making the magnetic data line to be stably wound. The present disclosure realizes storage of the magnetic date line without additional magnetic components and realizes adjustment of a diameter of the rings formed by winding the magnetic data line.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

Reference herein to "embodiment" means that a particular feature, structure, or characteristic described in connection with one embodiment may be comprised in at least one embodiment of the present disclosure. The appearances of the "embodiment" in various positions in the specification are not necessarily referring to the same embodiment, and are not independent or alternative embodiments mutually exclusive of other embodiments. Those skilled in the art explicitly and implicitly understand that the embodiments described herein may be combined with other embodiments.

Embodiment 1

Figure 1:
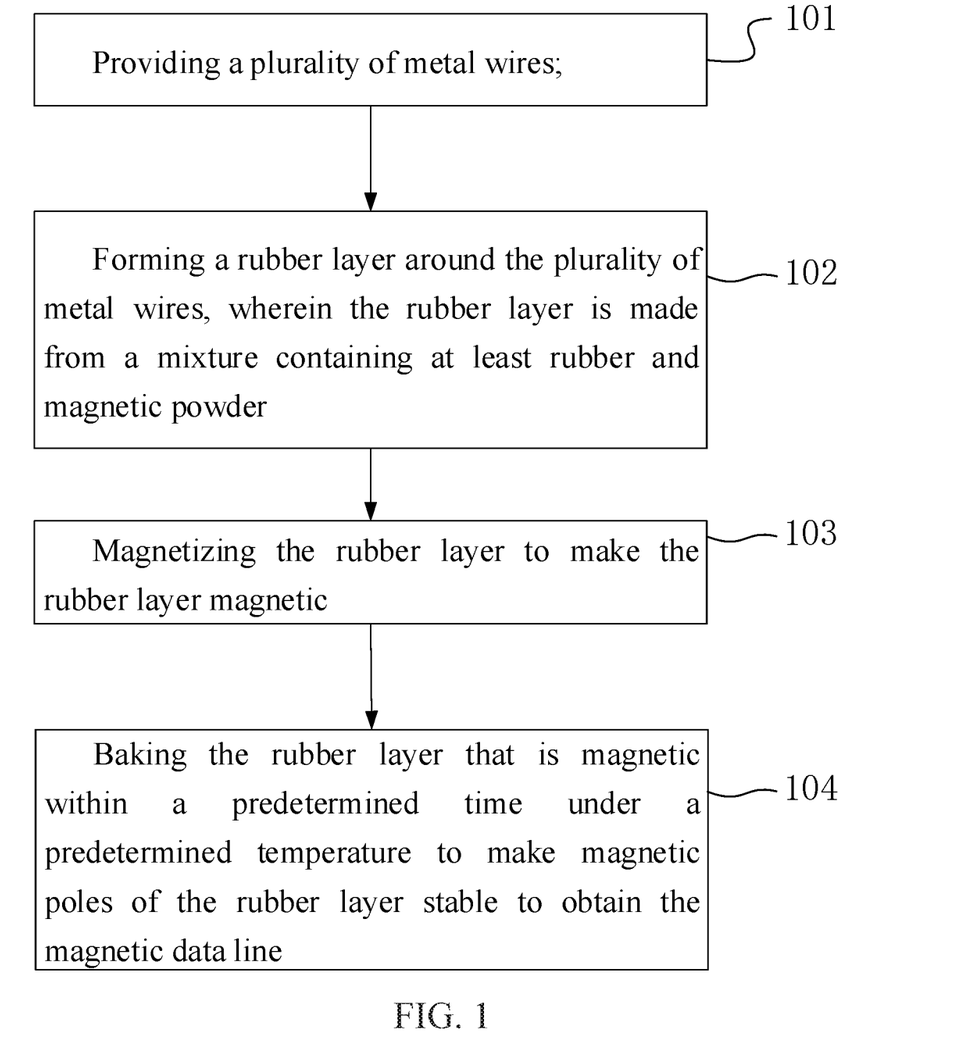
FIG. 1 is a first flow chart of a method for manufacturing a magnetic data line according to one embodiment of the present disclosure.

As shown in FIG. 1, FIG. 1 is a first flow chart of a method for manufacturing a magnetic data line according to one embodiment of the present disclosure. The method for manufacturing the magnetic data line comprises a step 101, a step 102, a step 103, and a step 104.

The step 101 is: providing a plurality of metal wires.

The plurality of metal wires may be understood as at least two metal wires, such as five metal wires. The plurality of metal wires may be made of same material, for example, the plurality of metal wires are made of copper. It is understood that the material of the plurality of metal wires is not limited to the copper. For example, the plurality of metal wires are made of alloys of copper and other metals. It should be understood that a scope of the plurality of metal wires defined in the embodiments of the present disclosure is not limited as long as the plurality of metal wires realize signal transmission.

In one optional embodiment of the present disclosure, an outer surface of each of the plurality of metal wires is wrapped with an insulating layer to prevent signal interference between the plurality of metal wires when in use, which also facilitates following steps performed on the plurality of metal wires.

The step 102 is: forming a rubber layer around the plurality of metal wires. The rubber layer is made from a mixture containing at least rubber and magnetic powder.

It should be noted that in the step 102 of forming the rubber layer around the plurality of metal wires, the plurality of metal wires need to be positioned first.

For example, first ends of the plurality of metal wires, such as ends A of the plurality of metal wires, are fixed to a first receiving component, and the plurality of metal wires are wound around the first receiving component.

Then, second ends of the plurality of metal wires, such as ends B of the plurality of metal wires, are fixed to a second receiving component. Therefore, the plurality of metal wires are positioned. Optionally, the plurality of metal wires are straightened for positioning.

Then, the rubber layer is formed around the plurality of metal wires.

In the step 102 of forming the rubber around the plurality of metal wires, a tool, such as a coating machine may be used. The coating machine may comprises a mold. The step 102 of forming the rubber layer around the plurality of metal wires comprises:

providing the mold sleeved on the plurality of metal wires;

The mold is configured to control a shape and a shape of the rubber layer. Specifically, the mod controls a shape and a size of a cross section of the rubber layer. The shape and the size of the cross section of the rubber layer will be explained below according to a structural schematic diagram of the magnetic data line.

injecting the mixture into the mold to form the rubber layer; and

The mixture is coated around the plurality of metal wires. It should be noted that the mixture is a rubber liquid contains at least the rubber and the magnetic powder. Before injecting the rubber liquid into the mold, the rubber liquid needs to be heated to ensure that the rubber liquid being able to flow effectively, so that the rubber liquid is evenly coated around the plurality of metal wires.

removing the mold after the rubber layer is formed.

Therefore, the rubber layer is formed around the plurality of metal wires.

Finally, the rubber layer and the plurality of metal wires are wound around the second receiving component. Specifically, the end A of each of the plurality of metal wires is released from the first receiving component, and then a motor is connected to the second receiving component. The motor drives the second receiving component to rotate, thereby winding the rubber layer and the plurality of metal wires on the second receiving component.

By control of the mold, the rubber layer is enabled to have a first surface and a second surface. The first surface of the rubber layer is opposite to the second surface of the rubber layer.

The step 103 is: magnetizing the rubber layer to make the rubber layer magnetic.

It should be noted that in the step 103 of magnetizing the rubber layer, the plurality of metal wires and the rubber layer also need to be positioned, and a specific positioning method may be referred to a positioning method depicted in the step 102, which is not repeatedly described herein.

After the plurality of metal wires and the rubber layer thereon are positioned, a tool, such as a magnetizer is used to magnetize the rubber layer. After magnetizing the rubber layer, the first surface of the rubber layer has a first magnetic pole and the second surface of the rubber layer that is magnetic has a second magnetic pole. A polarity of the first magnetic pole is opposite to a polarity of the second magnetic pole. For example, the polarity of the first magnetic pole is S pole, and the polarity of the second magnetic pole is N pole. Alternatively, the polarity of the first magnetic pole is N pole, and the polarity of the second magnetic pole is S pole. The polarity of the first magnetic pole is opposite to the polarity of the second magnetic pole. In other words, the first magnetic pole and the second magnetic pole are attracted to each other.

The step 104 is: baking the rubber layer that is magnetic within a predetermined time under a predetermined temperature to make magnetic poles of the rubber layer stable to obtain the magnetic data line.

Figure 2:
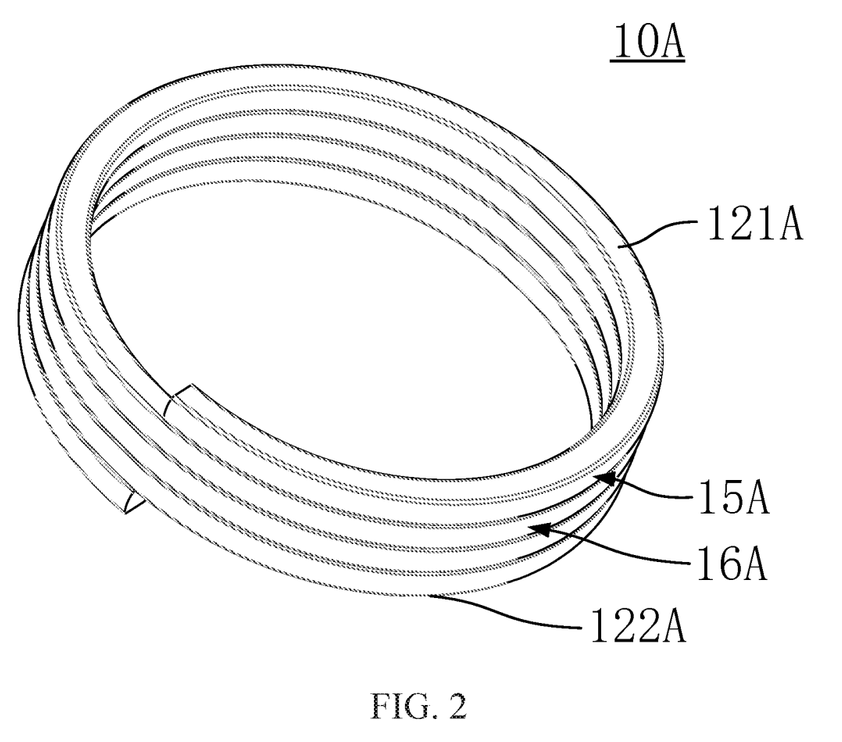
FIG. 2 is a schematic diagram of the magnetic data line manufactured by the method shown in FIG. 1 according to one embodiment of the present disclosure.
Figure 3:
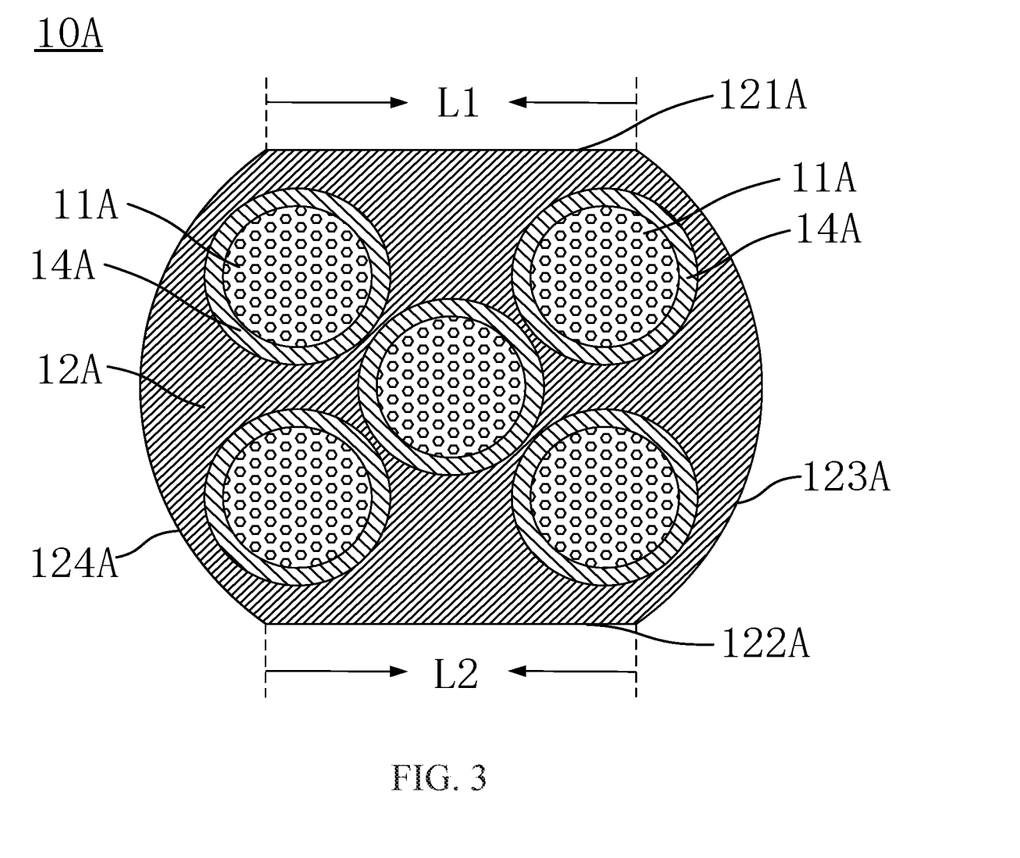
FIG. 3 is a cross-sectional schematic diagram of the magnetic data line manufactured by the method shown in FIG. 1 according to one embodiment of the present disclosure.

It is understood that after the step 104 is completed, the magnetic data line is obtained. The magnetic data line is shown in FIGS. 2 and 3, where FIG. 2 is a schematic diagram of the magnetic data line manufactured by the method shown in FIG. 1 according to one embodiment of the present disclosure, and FIG. 3 is a cross-sectional schematic diagram of the magnetic data line manufactured by the method shown in FIG. 1 according to one embodiment of the present disclosure.

In the step 104, the plurality of metal wires and the rubber layer that is magnetic are put into an oven, and the rubber layer that is magnetic is baked within the predetermined time under the predetermined temperature, so that the rubber layer that is magnetic is shaped, which also makes the rubber layer that is magnetic soft and the magnetic poles stable. The step 104 not only facilitates the winding of the magnetic data lines, but also increases the mutual attraction and stability of circular sections formed by winding of the magnetic data line, thereby increasing stacking stability.

The predetermined temperature is in a range of 80-110° C. Optionally, the predetermined temperature is 85° C., 90° C., 95° C., etc. The predetermined time is in a range of 25-35 min. Optionally, the predetermined time is 29 min, 30 min, 31 min etc.

In the embodiments of the present disclosure, the rubber layer after magnetizing is defined as a magnetic layer. It is understood that the rubber layer that is magnetic is a magnetic layer. The rubber layer after baking is defined as a magnetic attraction layer, and it is also understood that the rubber layer with stable magnetic poles is the magnetic attraction layer. It is understood that the first surface of the rubber layer is defined as the first surface of the magnetic layer and the first surface of the magnetic attraction layer. The second surface of the rubber layer is defined as the second surface of the magnetic layer and the second surface of the magnetic attraction layer.

As shown in FIGS. 2 and 3, because the mold limits the shape and the size of the rubber layer, a width of the first surface 121A of the rubber layer is not less than 3 mm, and a width of the second surface 122A of the rubber layer is not less than 3 mm. Optionally, the width of the first surface 121A of the rubber layer is 3 mm, 3.2 mm, 3.5 mm, etc., and the width of the second surface 122A of the rubber layer is 3 mm, 3.2 mm, 3.5 mm, etc.

In one optional embodiment, the width L1 of the first surface 121A of the rubber layer is equal to the width L2 of the second surface 122A of the rubber layer. Optionally, the width L1 of the first surface 121A of the rubber layer or the width L2 of the second surface 122A of the rubber layer is 3 mm, 3.2 mm, 3.5 mm, etc.

In one optional embodiment, the first surface 121A of the rubber layer is flat and the second surface 122A of the rubber layer is flat.

In one optional embodiment, the first surface 121A of the rubber layer is parallel to the second surface 122A of the rubber layer.

It is understood that in the embodiments of the present disclosure, the magnetic data line 10A is manufactured using the above method for manufacturing the magnetic data line, so that the magnetic data line 10A comprises the plurality of metal wires 11A and the magnetic attraction layer 12A.

The outer surface of each of the plurality of metal wires 11A is wrapped with the insulating layer 14A. The plurality of metal wires 11A are spaced apart from each other. Optionally, the magnetic attraction layer 12A is not only formed around the plurality of metal wires 11A, but also formed between the plurality of metal wires 11A.

In one optional embodiment, the magnetic attraction layer 12A further comprises a first arc surface 123A and a second arc surface 124A. The first arc surface 123A of the magnetic attraction layer 12A is opposite to the second arc surface 124A of the magnetic attraction layer 12A. The first arc surface 123A of the magnetic attraction layer 12A is connected with the first surface 121A and the second surface 122A of the magnetic attraction layer 12A. The second arc surface 124A of the magnetic attraction layer 12A is connected with the first surface 121A and the second surface 122A of the magnetic attraction layer 12A.

It should be noted that when the magnetic data line 10A is wound for storage, as shown in FIGS. 2 and 3, the magnetic data line 10A is tacked to form magnetic rings each defining a first side and a second side. The first side of each of the magnetic rings is adjacent and opposite to the second side of an adjacent magnetic ring of the magnetic rings. For example, the magnetic rings comprises a first magnetic ring 15A and a second magnetic ring 16A. The first magnetic ring 15A and the second magnetic ring 16A are stacked together and adjacent to each other. Two adjacent sides of the he first magnetic ring 15A and the second magnetic ring 16A, such as the first surface 121A and the second surface 122A, have opposite polarities and are attracted to each other. It is understood that since the two adjacent sides of the first magnetic ring 15A and the second magnetic ring 16A are invisible in the FIG. 2, the first surface 121A and the second surface 122A of the magnetic attraction layer 12A are described for illustration.

It should be noted that other steps may also be comprised between steps of the above method for manufacturing the magnetic data line. Specifically, after the step 103 of magnetizing the rubber layer to make the rubber layer magnetic and before the step 104 of baking the rubber layer within the predetermined time under the predetermined temperature to make the magnetic poles of the rubber layer stable to obtain the magnetic data line, the method further comprises winding the rubber layer that is magnetic and the plurality of metal wires in a fixture to enable the rubber layer that is magnetic to form the magnetic rings. Each of the magnetic rings defines the first side and the second side. The first side of each of the magnetic rings is adjacent and opposite to the second side of the adjacent magnetic ring of the magnetic rings. The step of baking the rubber layer that is magnetic within the predetermined time under the predetermined temperature to make the magnetic poles of the rubber layer stable to obtain the magnetic data line comprises baking the rubber layer wound in the fixture within the predetermined time under the predetermined temperature.

Further, after the step of 102 of forming the rubber layer around the plurality of metal wires and before the step 103 of magnetizing the rubber layer to make the rubber layer magnetic, the method further comprises forming a protective layer wrapping on an outer surface of the rubber layer.

Furthermore, after the step 103 of magnetizing the rubber layer to make the rubber layer magnetic and before the step 104 of baking the rubber layer that is magnetic within the predetermined time under the predetermined temperature to make the magnetic poles of the rubber layer stable to obtain the magnetic data line, the method further comprises cutting the magnetic rubber and the plurality of metal wires.

Moreover, after the step 103 of magnetizing the rubber layer to make the rubber layer magnetic and before the step of 104 baking the rubber layer that is magnetic within the predetermined time under the predetermined temperature to make the magnetic poles of the rubber layer stable to obtain the magnetic data line, the method further comprises welding a first connecting head to the first ends of the plurality of metal wires and welding a second connecting head to second ends of the plurality of metal wires.

Embodiments are given below with reference to the accompanying drawings.

Embodiment 2

Figure 4:
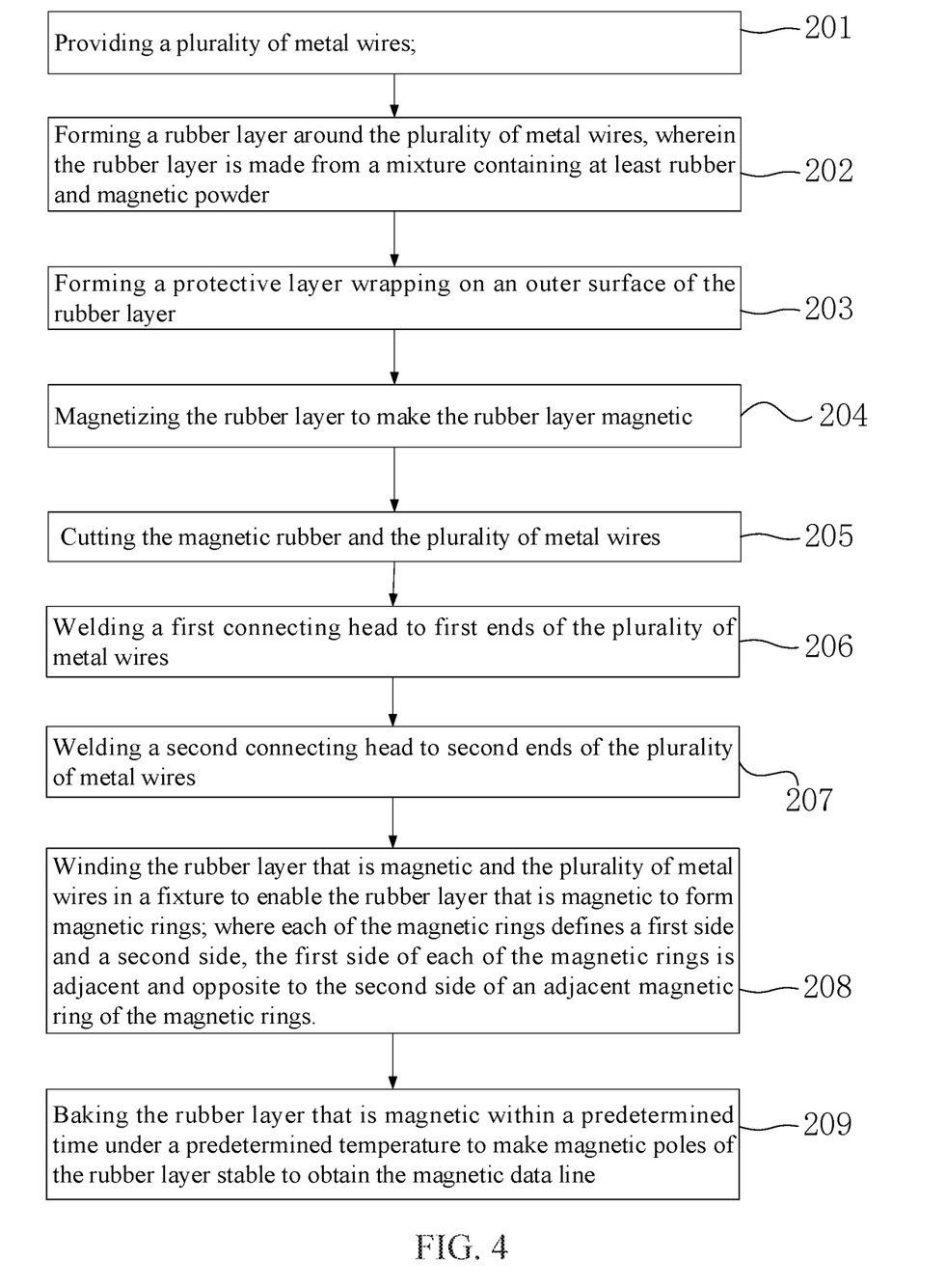
FIG. 4 is a second flow chart of the method for manufacturing the magnetic data line according to one embodiment of the present disclosure.

As shown in FIG. 4, FIG. 4 is a second flow chart of the method for manufacturing the magnetic data line according to one embodiment of the present disclosure. In other optional embodiments of the present disclosure, the method for manufacturing the magnetic data line comprises a step 201, a step 202, a step 203, a step 204, a step 205, a step 206, a step 207, a step 208, and a step 209.

The step 201 is: providing a plurality of metal wires. Specific illustration of the step 201 can be referred to the step 101, which is not repeatedly described herein.

The step 202 is: forming a rubber layer around the plurality of metal wires, where the rubber layer is made from a mixture containing at least rubber and magnetic powder. Specific illustration of the step 202 can be referred to the step 102, which is not repeatedly described herein.

The step 203 is: forming a protective layer wrapping on an outer surface of the rubber layer. A thickness of the protective layer is no more than 0.6 mm.

The protective layer protects the rubber layer, such as reducing or even eliminating weak electricity of the rubber layer after being magnetized, thereby preventing the rubber layer from cracking and preventing the rubber layer from being broken due to cracking. It should be noted that the thickness of the protective layer cannot be too thick. Specifically, the thickness of the protective layer should not be greater than 0.6 mm. When the thickness of the protective layer is greater than 0.6 mm, a magnetic force of the rubber layer after being magnetized is greatly weakened, which affects a convenience of storing the magnetic data line.

The step 203 of forming the protective layer wrapping on the outer surface of the rubber layer comprises wrapping a layer of braided wires on the outer surface of the rubber layer to form the protective layer. It should be noted that the protective layer is not limited to using the braided wires, and other protective structures may also be used.

It should be noted that in the step 203 of forming the protective layer wrapping on the outer surface of the rubber layer, the plurality of metal wires and the rubber layer must be positioned. Specific positioning method can refer to that mentioned in the step 102, which is not repeatedly described herein.

The step 204 is: magnetizing the rubber layer to make the rubber layer magnetic. Specific illustration of the step 204 can be referred to the step 103, which is not repeatedly described herein.

The step 205 is: cutting the magnetic rubber and the plurality of metal wires. A cutting machine is provided to cut the rubber layer and the plurality of metal wires together to obtain data wires of a required length.

It should be noted that the plurality of metal wires may be cut in advance and then other steps are performed, so the step 205 can be omitted. However, in actual processing and production process, if other steps are performed for each of cut metal wires, efficiency is low. Therefore, in the embodiment of the present disclosure, the step 205 is performed after a magnetizing operation of the rubber layer is completed, which improve the efficiency.

The step 206 is: welding a first connecting head to first ends of the plurality of metal wires. The first connecting head is configured to plug into a mobile device such as a mobile phone, a laptop, etc.

The step 207 is: welding a second connecting head to second ends of the plurality of metal wires. The second connecting head is configured to plug into a power supply device such as a charger.

It should be noted that an order of the step 206 and the step 207 may be reversed. For example, the second connecting is first welded to the second ends of the plurality of metal wires, and then the first connecting head is welded to the first ends of the plurality of metal wires.

It should be noted that before the step 206 and the step 207, portions of the rubber layer that is magnetic on two ends of each of the plurality of metal wires should be removed. Optionally, a first portion of the rubber layer that is magnetic wrapping on the first ends of the plurality of metal wires is removed and a second portion of the rubber layer that is magnetic wrapping on the second ends of the plurality of metal wires is removed. In an actual manufacturing process, a wire stripper is applied to remove the first portion of the rubber layer that is magnetic wrapping on the first ends of the plurality of metal wires and the second portion of the rubber layer that is magnetic wrapping on the second ends of the plurality of metal wires. Then a wire welding machine is applied to weld the first connecting head to the first ends of the plurality of metal wires and weld the second connecting head to the second ends of the plurality of metal wires.

In the actual manufacturing process, an injection molding machine is applied to injection mold the first connecting head and the first ends of the plurality of metal wires and injection mold the second connecting head and the second ends of the plurality of metal wires.

The step 208 is: winding the rubber layer that is magnetic and the plurality of metal wires in a fixture to enable the rubber layer that is magnetic to form magnetic rings. Each of the magnetic rings defines a first side and a second side. The first side of each of the magnetic rings is adjacent and opposite to the second side of an adjacent magnetic ring of the magnetic rings.

Figure 5:
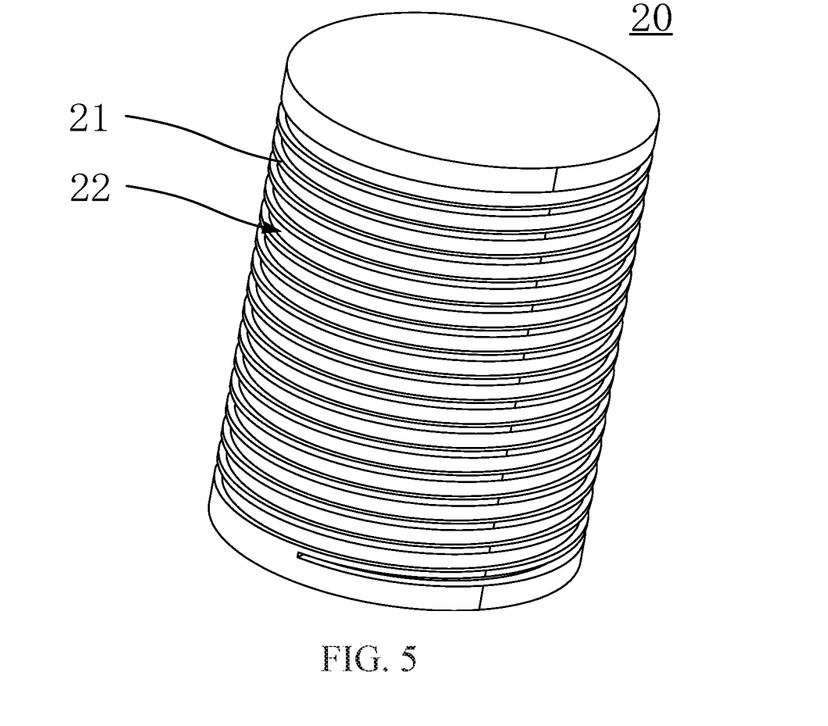
FIG. 5 is a structural schematic diagram of a fixture according to one embodiment of the present disclosure.
Figure 6:
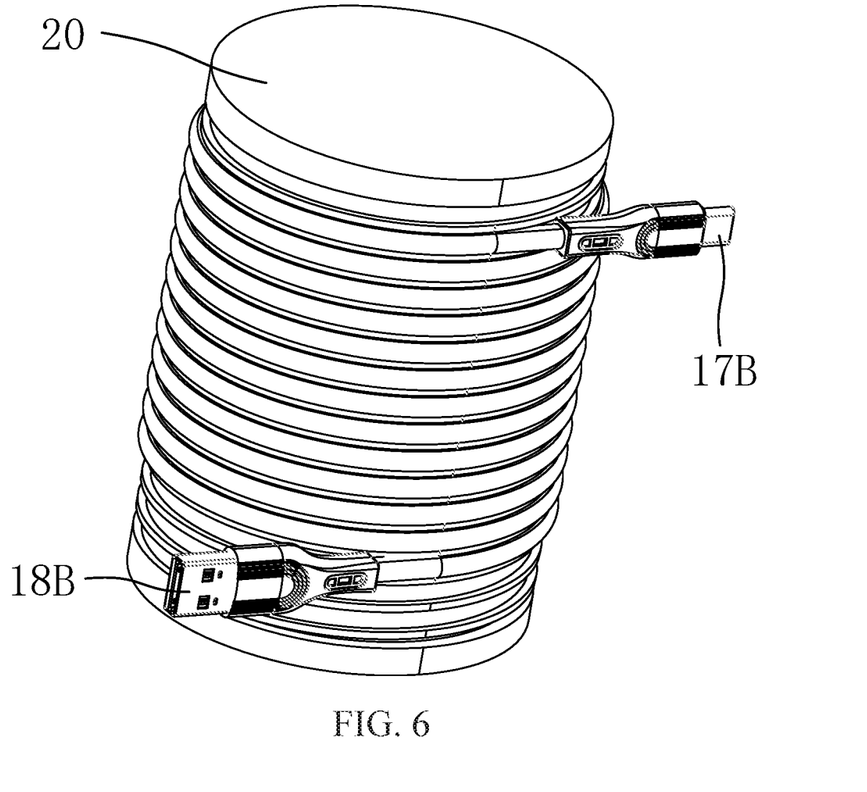
FIG. 6 is a structural schematic diagram of the magnetic date line winding in the fixture according to one embodiment of the present disclosure.

As shown in FIGS. 5 and 6, FIG. 5 is a structural schematic diagram of a fixture according to one embodiment of the present disclosure, and FIG. 6 is a structural schematic diagram of the magnetic date line winding in the fixture according to one embodiment of the present disclosure.

The fixture 20 comprises a baffling structure 21 arranged on a circumferential side thereof. The baffling structure is spirally mounted to form a groove structure 22 on the circumferential side of the fixture 20. The rubber layer and the plurality of metal wires are placed in the groove structure 22. In other optional embodiments of the present disclosure, the plurality of metal wires, the rubber layer, and the protective layer are placed in the groove structure 22.

In one optional embodiment, an outer surface of the rubber layer that is magnetic is matched with the groove structure 22, so that the baffling structure 22 limits the outer surface of the rubber layer.

The step 209 is: baking the rubber layer that is magnetic within a predetermined time under a predetermined temperature to make magnetic poles of the rubber layer stable to obtain the magnetic data line. Specific illustration of the step 209 can be referred to the step 104, which is not repeatedly described herein.

It should be noted that winding the rubber layer around the fixture 20 and then baking the rubber layer can make the magnetic poles of the rubber layer (i.e., the magnetic attraction layer) stable and avoid confusion of the magnetic poles of the magnetic attraction layer, and thus making the magnetic rings to be stably and neatly stacked.

Figure 7:
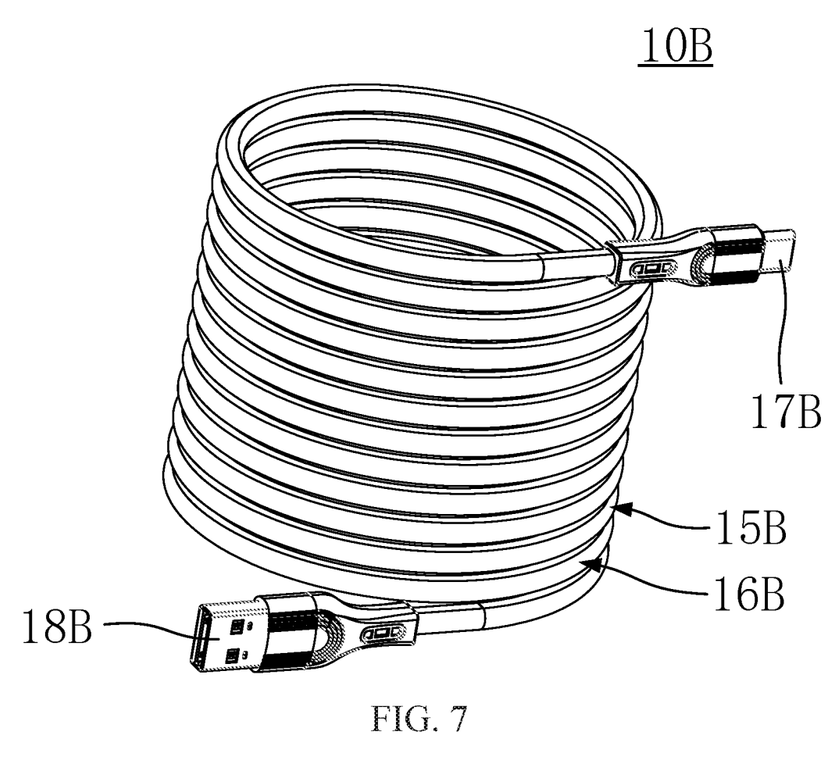
FIG. 7 is a schematic diagram of the magnetic data line manufactured by the method shown in FIG. 4 according to one embodiment of the present disclosure.
Figure 8:
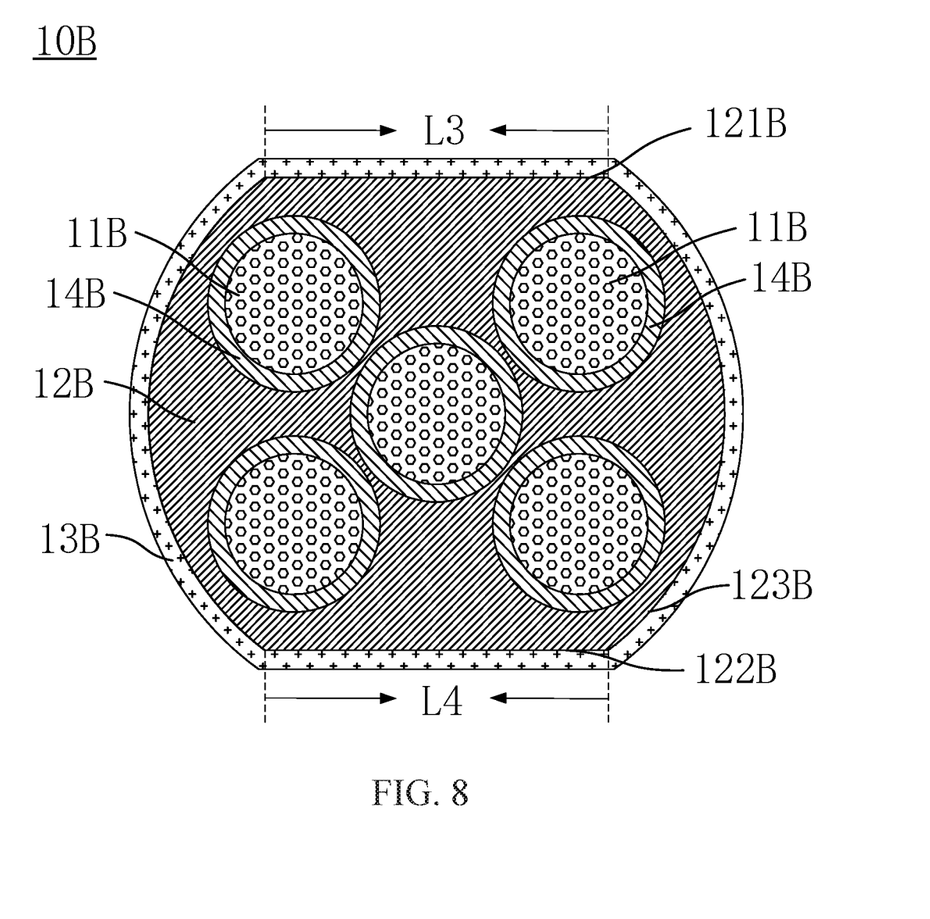
FIG. 8 is a cross-sectional schematic diagram of the magnetic data line manufactured by the method shown in FIG. 4 according to one embodiment of the present disclosure.

As shown in FIGS. 7 and 8, FIG. 7 is a schematic diagram of the magnetic data line manufactured by the method shown in FIG. 4 according to one embodiment of the present disclosure, and FIG. 8 is a cross-sectional schematic diagram of the magnetic data line manufactured by the method shown in FIG. 4 according to one embodiment of the present disclosure.

The magnetic data line 10B is manufactured using the above method for manufacturing the magnetic data line, so that the magnetic data line 10B comprises the plurality of metal wires 11B, the magnetic attraction layer 12B and the protective layer 13B.

The outer surface of each of the plurality of metal wires 11B is wrapped with the insulating layer 14B. The plurality of metal wires 11B are spaced apart from each other. For example, the magnetic attraction layer 12B is not only formed around the plurality of metal wires 11B, but also formed between the plurality of metal wires 11B.

Because the mold limits the shape and the size of the rubber layer, a width L3 of the first surface 121B of the rubber layer is not less than 3 mm, and a width L4 of the second surface 122B of the rubber layer is not less than 3 mm. Optionally, the width L3 of the first surface 121B of the rubber layer is 3 mm, 3.2 mm, 3.5 mm, etc., and the width L4 of the second surface 122B of the rubber layer is 3 mm, 3.2 mm, 3.5 mm, etc.

In one optional embodiment, the width L3 of the first surface 121B of the rubber layer is equal to the width L4 of the second surface of the rubber layer. Optionally, the width of the first surface 121B of the rubber layer or the width of the second surface 122B of the rubber layer is 3 mm, 3.2 mm, 3.5 mm, etc.

In one optional embodiment, the first surface 121B of the rubber layer is flat and the second surface 122B of the rubber layer is flat.

In one optional embodiment, the first surface 121B of the rubber layer is parallel to the second surface 122B of the rubber layer.

In one optional embodiment, the magnetic attraction layer 12B further comprises a first arc surface 123B and a second arc surface 124B. The first arc surface 123B of the magnetic attraction layer 12B is opposite to the second arc surface 124B of the magnetic attraction layer 12B. The first arc surface 123B of the magnetic attraction layer 12B is connected with the first surface 121B and the second surface 122B of the magnetic attraction layer 12B. The second arc surface 124B of the magnetic attraction layer 12B is connected with the first surface 121B and the second surface 122B of the magnetic attraction layer 12B.

It should be noted that when the magnetic data line 10B is wound for storage, as shown in FIGS. 6-8, the magnetic data line 10B is tacked to form the magnetic rings each defining a first side and a second side. The first side of each of the magnetic rings is adjacent and opposite to the second side of an adjacent magnetic ring of the magnetic rings. For example, the magnetic rings comprises a first magnetic ring 15B and a second magnetic ring 16B. The first magnetic ring 15B and the second magnetic ring 16B are stacked together and adjacent to each other. Two adjacent sides of the he first magnetic ring 15B and the second magnetic ring 16B, such as the first surface 121B and the second surface 122B, have opposite polarities and are attracted to each other. It is understood that since the two adjacent sides of the first magnetic ring 15B and the second magnetic ring 16B are invisible, the first surface 121B and the second surface 122B of the magnetic attraction layer 12B are described for illustration.

As shown in FIGS. 6-8, the magnetic data line 10B further comprise the first connecting head 17B and the second connecting head 18B, so that the magnetic data line 10B is served as a charging line. It is understood that the first connecting head and the second connecting head may be other connecting heads having different structures, which is not limited thereto.

The above embodiments of the present disclosure provide a detailed illustration to the method for manufacturing the magnetic data line, the magnetic data line thereof, and the fixture used in the manufacturing process. In the present disclosure, specific embodiments are applied to illustrate the principles and implementations of the present disclosure. The above description of the embodiments is only used to better understand methods and core ideas of the present disclosure. Meanwhile, according to the ideas of the present disclosure, changes are made in the specific implementations and the application scope by those skilled in the art. Therefore, the contents of the specification should not be regarded as a limitation of the present disclosure.

What is claimed is:

1. A method for manufacturing a magnetic data line, comprising:
   providing a plurality of metal wires;
   forming a rubber layer around the plurality of metal wires, wherein the rubber layer is made from a mixture containing at least rubber and magnetic powder;
   magnetizing the rubber layer to make the rubber layer magnetic; and
   baking the rubber layer that is magnetic within a predetermined time under a predetermined temperature to make magnetic poles of the rubber layer stable to obtain the magnetic data line.

2. The method according to claim 1, wherein the step of forming the rubber layer around the plurality of metal wires comprises:
   providing a mold sleeved on the plurality of metal wires;
   injecting the mixture into the mold to form the rubber layer, wherein the mixture is coated around the plurality of metal wires;
   removing the mold after the rubber layer is formed; and
   enabling the rubber layer to have a first surface and a second surface; wherein the first surface of the rubber layer is opposite to the second surface of the rubber layer.

3. The method according to claim 2, wherein after magnetizing the rubber layer, the first surface of the rubber layer has a first magnetic pole and the second surface of the rubber layer that is magnetic has a second magnetic pole; a polarity of the first magnetic pole is opposite to a polarity of the second magnetic pole.

4. The method according to claim 2, wherein a width of the first surface of the rubber layer is not less than 3 mm, and a width of the second surface of the rubber layer is not less than 3 mm.

5. The method according to claim 4, wherein the width of the first surface of the rubber layer is equal to the width of the second surface of the rubber layer.

6. The method according to claim 4, wherein the first surface of the rubber layer is flat and the second surface of the rubber layer is flat.

7. The method according to claim 6, wherein the first surface of the rubber layer is parallel to the second surface of the rubber layer.

8. The method according to claim 6, wherein the rubber layer further comprises a first arc surface and a second arc surface; the first arc surface of the rubber layer is opposite to the second arc surface of the rubber layer; the first arc surface of the rubber layer is connected with the first surface and the second surface of the rubber layer, and the second arc surface of the rubber layer is connected with the first surface and the second surface of the rubber layer.

9. The method according to claim 2, wherein after the step of magnetizing the rubber layer to make the rubber layer magnetic and before the step of baking the rubber layer within the predetermined time under the predetermined temperature to make the magnetic poles of the rubber layer stable to obtain the magnetic data line, the method further comprises:
   winding the rubber layer that is magnetic and the plurality of metal wires in a fixture to enable the rubber layer that is magnetic to form magnetic rings, wherein each of the magnetic rings defines a first side and a second side; the first side of each of the magnetic rings is adjacent and opposite to the second side of an adjacent magnetic ring of the magnetic rings;
   wherein the step of baking the rubber layer that is magnetic within the predetermined time under the predetermined temperature to make the magnetic poles of the rubber layer stable to obtain the magnetic data line comprises baking the rubber layer wound in the fixture within the predetermined time under the predetermined temperature.

10. The method according to claim 9, wherein the fixture comprises a groove structure, and an outer surface of the rubber layer that is magnetic is matched with the groove structure.

11. The method according to claim 1, wherein the predetermined temperature is in a range of 80-110° C.

12. The method according to claim 1, wherein the predetermined time is in a range of 25-35 min.

13. The method according to claim 1, wherein after the step of forming the rubber layer around the plurality of metal wires and before the step of magnetizing the rubber layer to make the rubber layer magnetic, the method further comprises forming a protective layer wrapping on an outer surface of the rubber layer.

14. The method according to claim 13, wherein a thickness of the protective layer is no more than 0.6 mm.

15. The method according to claim 13, wherein the step of forming the protective layer wrapping on the outer surface of the rubber layer comprises wrapping a layer of braided wires on the outer surface of the rubber layer to form the protective layer.

16. The method according to claim 1, wherein after the step of magnetizing the rubber layer to make the rubber layer magnetic and before the step of baking the rubber layer that is magnetic within the predetermined time under the predetermined temperature to make the magnetic poles of the rubber layer stable to obtain the magnetic data line, the method further comprises cutting the rubber layer that is magnetic and the plurality of metal wires.

17. The method according to claim 1, wherein after the step of magnetizing the rubber layer to make the rubber layer magnetic and before the step of baking the rubber layer that is magnetic within the predetermined time under the predetermined temperature to make the magnetic poles of the rubber layer stable to obtain the magnetic data line, the method further comprises
   welding a first connecting head to first ends of the plurality of metal wires; and
   welding a second connecting head to second ends of the plurality of metal wires.

18. The method according to claim 17, wherein before the step of welding the first connecting head to the first ends of the plurality of metal wires, the method further comprises:
   removing a first portion of the rubber layer that is magnetic wrapping on the first ends of the plurality of metal wires; and
   removing a second portion of the rubber layer that is magnetic wrapping on the second ends of the plurality of metal wires.

* * * * *